United States Patent
Saratani

(10) Patent No.: US 9,933,859 B2
(45) Date of Patent: Apr. 3, 2018

(54) CHARACTER INPUT SYSTEM, INFORMATION PROCESSING APPARATUS, CHARACTER INPUT METHOD

(71) Applicant: KYOCERA Document Solutions Inc., Osaka-shi, Osaka (JP)

(72) Inventor: Ken Saratani, Osaka (JP)

(73) Assignee: KYOCERA Document Solutions Inc., Osaka-shi, Osaka (JP)

( * ) Notice: Subject to any disclaimer, the term of this patent is extended or adjusted under 35 U.S.C. 154(b) by 169 days.

(21) Appl. No.: 14/697,491

(22) Filed: Apr. 27, 2015

(65) Prior Publication Data

US 2015/0346841 A1    Dec. 3, 2015

(30) Foreign Application Priority Data

May 30, 2014    (JP) .................................. 2014-112593

(51) Int. Cl.
| | |
|---|---|
| *G06F 3/023* | (2006.01) |
| *G06F 3/0346* | (2013.01) |
| *G06K 9/00* | (2006.01) |
| *G06F 3/0487* | (2013.01) |
| *G06F 3/01* | (2006.01) |

(52) U.S. Cl.
CPC ............ *G06F 3/0233* (2013.01); *G06F 3/018* (2013.01); *G06F 3/0346* (2013.01); *G06F 3/0487* (2013.01)

(58) Field of Classification Search
CPC .............................. G06F 3/0233; G06F 3/0346
See application file for complete search history.

(56) References Cited

U.S. PATENT DOCUMENTS

| | | | | |
|---|---|---|---|---|
| 8,482,526 B2* | 7/2013 | Tojima | .................. | G06F 3/0233 345/168 |
| 2010/0289746 A1* | 11/2010 | Tojima | .................. | G06F 17/276 345/168 |
| 2011/0109558 A1* | 5/2011 | Park | ...................... | G06F 3/0233 345/171 |
| 2011/0298831 A1* | 12/2011 | Fujita | .................... | G06F 3/0325 345/661 |
| 2012/0190407 A1* | 7/2012 | Miura | .................. | G06F 17/276 455/563 |
| 2012/0236134 A1* | 9/2012 | Keyes | .................... | G06K 9/228 348/62 |

(Continued)

FOREIGN PATENT DOCUMENTS

JP          2005332118 A       12/2005

*Primary Examiner* — Afroza Chowdhury
(74) *Attorney, Agent, or Firm* — Alleman Hall Creasman & Tuttle LLP

(57) ABSTRACT

A character input system includes a mobile terminal and an information processing apparatus. The mobile terminal includes: a motion detecting portion configured to detect a motion of shaking the mobile terminal; and a notification processing portion configured to transmit a motion notification to the information processing apparatus when the motion detecting portion detects the motion of shaking the mobile terminal. The information processing apparatus includes: a character input portion configured to receive a character input operation; and a conversion processing portion configured to, upon reception of the motion notification from the mobile terminal, convert an input character that has been input on the character input portion.

6 Claims, 9 Drawing Sheets

(56) References Cited

U.S. PATENT DOCUMENTS

| | | | |
|---|---|---|---|
| 2013/0157719 A1* | 6/2013 | Liu | G06F 3/017 455/556.1 |
| 2013/0215153 A1* | 8/2013 | Park | G09G 5/363 345/650 |
| 2013/0267177 A1* | 10/2013 | Umezawa | H04L 63/0492 455/41.2 |
| 2013/0276125 A1* | 10/2013 | Bailey | H04L 63/1433 726/25 |
| 2014/0040954 A1* | 2/2014 | Yamamoto | G06F 3/0346 725/39 |
| 2014/0118260 A1* | 5/2014 | Chen | G06F 3/0346 345/158 |
| 2014/0331181 A1* | 11/2014 | Hildreth | G06F 3/011 715/821 |
| 2014/0351753 A1* | 11/2014 | Shin | G06F 3/0488 715/810 |
| 2015/0253908 A1* | 9/2015 | Go | G06F 3/046 345/173 |

* cited by examiner

CHARACTER INPUT SYSTEM, INFORMATION PROCESSING APPARATUS, CHARACTER INPUT METHOD

INCORPORATION BY REFERENCE

This application is based upon and claims the benefit of priority from the corresponding Japanese Patent Application No. 2014-112593 filed on May 30, 2014, the entire contents of which are incorporated herein by reference.

BACKGROUND

The present disclosure relates to a character input system having a character input function, to a character input method, and to an information processing apparatus used in these.

There is known a technology, for use in, for example, a mobile terminal such as a mobile phone, for detecting a motion of the mobile terminal by using a vibration sensor or an acceleration sensor and inputting information corresponding to the detected motion.

SUMMARY

A character input system according to an aspect of the present disclosure includes a mobile terminal and an information processing apparatus. The mobile terminal includes: a motion detecting portion configured to detect a motion of shaking the mobile terminal; and a notification processing portion configured to transmit a motion notification to the information processing apparatus when the motion detecting portion detects the motion of shaking the mobile terminal. The information processing apparatus includes: a character input portion configured to receive a character input operation; and a conversion processing portion configured to, upon reception of the motion notification from the mobile terminal, convert an input character that has been input on the character input portion.

An information processing apparatus according to another aspect of the present disclosure includes a character input portion and a conversion processing portion. The character input portion receives a character input operation. The conversion processing portion, upon reception of a motion notification, converts an input character that has been input on the character input portion, the motion notification being transmitted from the mobile terminal when a motion of shaking the mobile terminal is detected.

In a character input method according to a further aspect of the present disclosure, upon detection of a motion of shaking a mobile terminal, the mobile terminal transmits a motion notification to an information processing apparatus, and the information processing apparatus, upon reception of the motion notification, converts an input character that has been input on a character input portion.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The following describes an embodiment of the present disclosure with reference to the accompanying drawings for the understanding of the disclosure. It should be noted that the following description is an example of a specific embodiment of the present disclosure and should not limit the technical scope of the disclosure.

<Character Input System 1>

Figure 1:
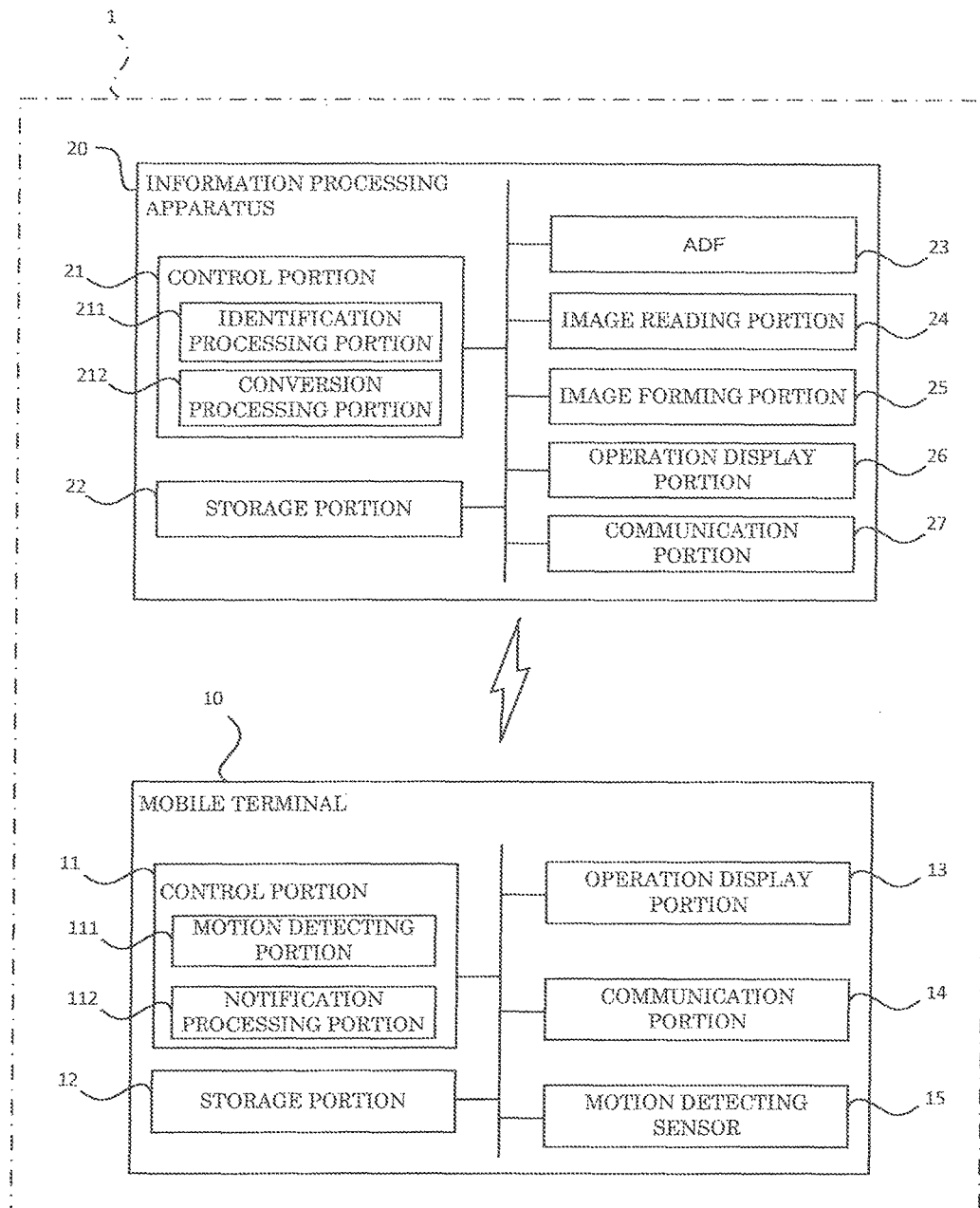
FIG. 1 is a block diagram showing the configuration of a character input system according to an embodiment of the present disclosure.

As shown in FIG. 1, a character input system 1 according to an embodiment of the present disclosure includes a mobile terminal 10 and an information processing apparatus 20. The mobile terminal 10 and the information processing apparatus 20 can communicate with each other based on Bluetooth (registered trademark) which is a short-distance wireless communication standard. It is noted that the mobile terminal 10 and the information processing apparatus 20 may be configured to communicate with each other via a network based on any other communication standard such as a wireless LAN standard.

<Mobile Terminal 10>

As shown in FIG. 1, the mobile terminal 10 includes a control portion 11, a storage portion 12, an operation display portion 13, a communication portion 14, and a motion detecting sensor 15. The mobile terminal 10 is a mobile communication terminal that can be carried by the user, and is, for example, a smartphone, a mobile phone, a tablet terminal, PDA, or the like.

The control portion 11 includes control equipment such as CPU, ROM, RAM, and EEPROM that are not shown, and controls the operation of the mobile terminal 10 by executing control programs stored in the ROM, by using the CPU. It is noted that the control portion 11 may be an electronic circuit such as an integrated circuit (ASIC).

The storage portion 12 may be a nonvolatile storage such as a flash memory, and the control portion 11 can read and write information from/to the storage portion 12. Specifically, the storage portion 12 stores various types of control programs that are executed by the control portion 11. In addition, the storage portion 12 can store scan data that is received from the information processing apparatus 20, or various types of documents that can be transmitted to the information processing apparatus 20. It is noted that the term "document" refers to such information that contains various types of contents such as texts, tables, images, photographs and the like.

The operation display portion 13 includes a display portion and an operation portion. The display portion is, for example, a liquid crystal panel that displays various types of information in response to control instructions from the control portion 11. The operation portion includes a touch panel for detecting a touch operation of the user touching an operation key displayed on the display portion.

The communication portion 14 performs a communication with an external apparatus such as the information processing apparatus 20 based on a predetermined wireless communication standard. Specifically, the communication portion 14 supports Class 2 Bluetooth (registered trademark) transmission level and can execute a wireless communication with an external communication apparatus that is present within a range of approximately 10 m by a radio wave intensity of 2.5 mW. It is noted that the data communication method based on Bluetooth is well-known, and description thereof is omitted. It is noted that the communication portion 14 may perform communication based on any other short-distance wireless communication standard such as NFC (Near Field Communication) or a wireless LAN standard such as an IEEE standard. For example, the communication portion 14 may perform an NFC wireless communication with an external communication apparatus that is present within a communication range of approximately 10 cm from the mobile terminal 10 by using a frequency band of 13.56 MHz.

The motion detecting sensor 15 is, for example, a three-axis acceleration sensor that detects the motion of the mobile terminal 10 in the horizontal and vertical directions (up-down direction, left-right direction and front-rear direction), and detects the presence or absence of a motion of shaking the mobile terminal 10 and the direction of the shaking motion. It is noted that the motion detecting sensor 15 may include one or more vibration sensors, acceleration sensors, displacement sensors or the like as far as it can detect the motion of shaking the mobile terminal 10.

<Information Processing Apparatus 20>

As shown in FIG. 1, the information processing apparatus 20 is a multifunction peripheral including a control portion 21, a storage portion 22, an ADF 23, an image reading portion 24, an image forming portion 25, an operation display portion 26, and a communication portion 27. The information processing apparatus 20 may have a plurality of functions such as a print function, a facsimile function, a scan function, and a copy function. It is noted that the present disclosure is also applicable to an image reading apparatus such as a scanner, a printer, a facsimile apparatus, and a copier, and to an information processing apparatus such as an image forming apparatus. In addition, the present disclosure is also applicable to various types of information processing apparatuses such as a personal computer or a TV receiver.

The control portion 21 includes control equipment such as CPU, ROM, RAM, and EEPROM that are not shown, and controls the operation of the information processing apparatus 20 by executing control programs stored in the ROM, by using the CPU. It is noted that the control portion 21 may be an electronic circuit such as an integrated circuit (ASIC).

The storage portion 22 is a storage such as SSD (Solid State Drive) or HDD (Hard Disk Drive), wherein the control portion 21 can read and write information from/to the storage portion 22. Specifically, the storage portion 22 stores the various types of programs executed by the control portion 21. In addition, the storage portion 22 stores documents such as image data received from the mobile terminal 10.

The ADF 23 is an automatic document feeding device that automatically feeds a reading target sheet. The image reading portion 24 is configured to read image data, by using an image sensor such as CCD or CIS, from a sheet fed by the ADF 23 or a sheet placed on a document sheet table. The image forming portion 25 is configured to form an image on a sheet based on the image data by the electrophotography or ink jet method.

The operation display portion 26 includes a display portion and an operation portion. The display portion is, for example, a liquid crystal display, and displays various types of information in response to control instructions from the control portion 21. The operation portion includes a touch panel for receiving various types of input operations performed by the user. Specifically, the operation display portion 26 is an example of a character input portion for receiving a character input operation based on a user operation performed on the operation portion.

Here, FIG. 4A, FIG. 4B, FIG. 5A and FIG. 5B show examples of character input screens that are displayed on the operation display portion 26 when the character input operation is performed on the operation display portion 26. It is noted that a character input screen is displayed when a registration of an address book, a user registration, a destination input or the like is performed on the information processing apparatus 20. Specifically, on the character input screen, a software keyboard 261 and a character input field 262 are displayed. The operation display portion 26 receives an operation performed on touch keys of the software keyboard 261 via the touch panel, and displays the input characters in the character input field 262. It is noted that the software keyboards 261 shown in FIG. 4A, FIG. 4B, FIG. 5A and FIG. 5B can be switched from each other as appropriate.

The communication portion 27 performs a communication with an external apparatus such as the mobile terminal 10 based on a predetermined wireless communication standard. Specifically, the communication portion 14 supports Class 2 Bluetooth (registered trademark) transmission level and can execute a wireless communication with an external communication apparatus that is present within a range of approximately 10 m by a radio wave intensity of 2.5 mW. It is noted that the data communication method based on Bluetooth is well-known, and description thereof is omitted. It is noted that the communication portion 27 may perform communications based on any other short-distance wireless communication standard such as NFC (Near Field Communication) or a wireless LAN standard such as an IEEE standard. For example, as in the mobile terminal 10, the communication portion 27 may perform an NFC wireless communication with an external communication apparatus that is present within a communication range of approximately 10 cm from the information processing apparatus 20 by using a frequency band of 13.56 MHz.

Meanwhile, there is known a technology for detecting, in the mobile terminal 10, a motion of the mobile terminal 10 and inputting information corresponding to the detected motion. On the other hand, when the information processing apparatus 20 is difficult to move, the user of the information processing apparatus 20 is expected to input characters only by performing operations on the operation display portion 26 which is provided on the information processing apparatus 20. In contrast, as described below, the character input system 1 of the present embodiment allows the user to perform a character input operation efficiently on the information processing apparatus 20 by using the mobile terminal 10.

Specifically, the control portion 11 of the mobile terminal 10 functions as a motion detecting portion 111 and a notification processing portion 112 when it executes, by using the CPU, the control programs stored in the ROM.

The motion detecting portion 111 executes a process for detecting the motion of shaking the mobile terminal 10 by using the motion detecting sensor 15. When the motion detecting portion 111 detects the motion of shaking the mobile terminal 10, the notification processing portion 112 transmits a motion notification to the information processing apparatus 20 on the condition that a communication has been established therewith, wherein the motion notification indicates the detection of the motion of shaking the mobile terminal 10.

In addition, the control portion 21 of the information processing apparatus 20 functions as an identification processing portion 211 and a conversion processing portion 212 when it executes, by using the CPU, the control programs stored in the ROM.

The identification processing portion 211 executes a user authentication process (login process) for identifying the user of the information processing apparatus 20. It is noted that information such as the user ID and password is registered in advance and stored in the storage portion 22. In addition, the storage portion 22 stores a plurality of pieces of identification information of the mobile terminal 10 in correspondence with a plurality of users. The identification information is a paring ID, an IP address or the like. This enables the control portion 21 to identify the mobile terminal 10 that corresponds to the user identified by the identification processing portion 211.

Upon receiving the motion notification from the mobile terminal 10 in the state where the operation display portion 26 has received an input character, the conversion processing portion 212 performs a conversion process of converting the input character, wherein the motion notification indicates that the motion of shaking the mobile terminal 10 was detected. Specifically, in the conversion process, the conversion processing portion 212 may convert the input character to a large character or a small character. In addition, the conversion processing portion 212 may convert the input character to any of a basic kana character, a double consonant, a palatalized sound, a voiced consonant, and a p-sound. Furthermore, each time the motion notification is received, the conversion processing portion 212 may convert, in sequence, the input character to any of a plurality of representable forms among a large character, a small character, a basic kana character, a double consonant, a palatalized sound, a voiced consonant, and a p-sound. It is noted that the conversion processing portion 212 may convert the input character to a Japanese hiragana character, a Japanese katakana character, a Chinese character, or an alphabetical character. In the following, the present embodiment is described by taking, as an example, a case where the conversion processing portion 212 converts the input character to a large character or a small character.

Figure 2:
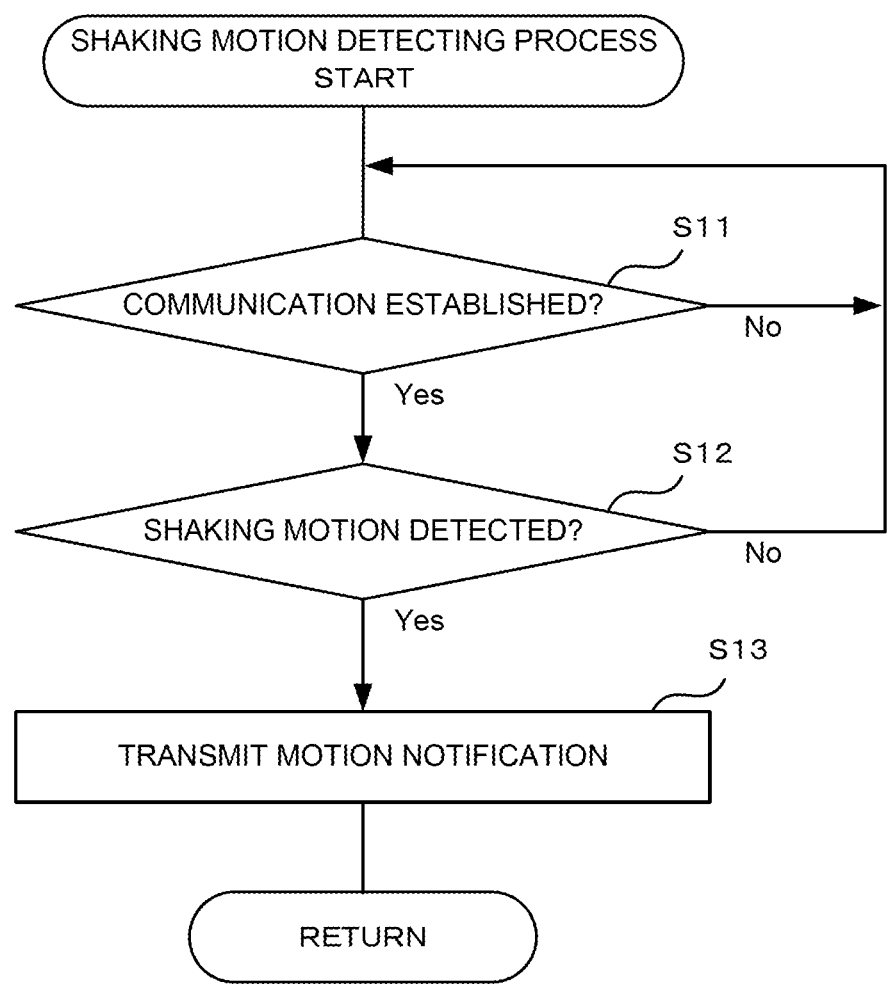
FIG. 2 is a flowchart showing an example of a process that is executed by a mobile terminal of the character input system according to an embodiment of the present disclosure.
Figure 3:
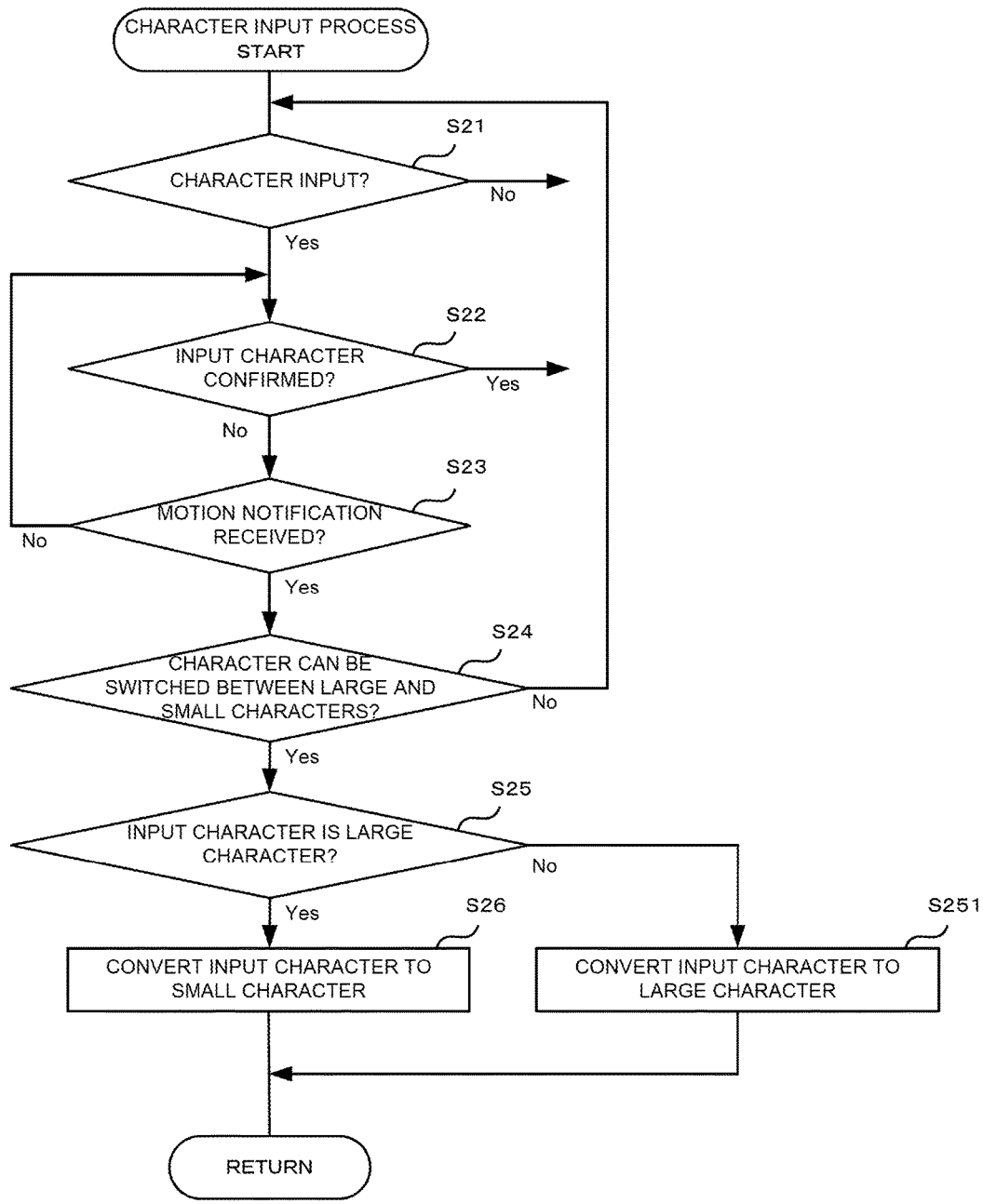
FIG. 3 is a flowchart showing an example of a process that is executed by an information processing apparatus of the character input system according to the first embodiment of the present disclosure.

The following describes, with reference to flowcharts of FIG. 2 and FIG. 3, examples of a shaking motion detecting process and a character input process that are respectively executed by the control portion 11 and the control portion 21 in the character input system 1 based on the control programs. It is noted that the present disclosure may be regarded as an invention of a character input method in which the control portion 11 and the control portion 21 execute the procedures of the shaking motion detecting process and the character input process, respectively.

[Shaking Motion Detecting Process]

First, the shaking motion detecting process executed by the control portion 11 on the mobile terminal 10 side is described with reference to FIG. 2.

<Step S11>

As shown in FIG. 2, in the mobile terminal 10, at step S11, the control portion 11 determines whether or not a predetermined communication has been established with the information processing apparatus 20. Upon determining that the predetermined communication has been established with the information processing apparatus 20 (Yes side at S11), the control portion 11 executes the process of step S12 and onward. On the other hand, upon determining that the predetermined communication has not been established with the information processing apparatus 20 (No side at S11), the control portion 11 repeatedly executes the determination process of step S11.

<Step S12>

Next, at step S12, the control portion 11 determines whether or not the motion of shaking the mobile terminal 10 was detected by the motion detecting sensor 15. It is noted that the process of step S12 is executed by the motion detecting portion 111 of the control portion 11. Here, the motion of shaking the mobile terminal 10 may be, for example, a motion of moving the mobile terminal 10 in one direction or a sequential reciprocal motion of moving the mobile terminal 10 in one direction and pulling back in the opposite direction. As another example, the control portion 11 may recognize a motion of reciprocally moving the mobile terminal 10 a plurality of times as the motion of shaking the mobile terminal 10. Upon determining that the motion of shaking the mobile terminal 10 was detected (Yes side at S12), the control portion 11 moves the process to step S13. On the other hand, upon determining that the motion of shaking the mobile terminal 10 has not been detected (No side at S12), the control portion 11 returns the process to step S11.

<Step S13>

At step S13, the control portion 11 causes the communication portion 14 to transmit, to the information processing apparatus 20, the motion notification which indicates that the motion of shaking the mobile terminal 10 was detected. Specifically, the control portion 11 transmits the motion notification to the information processing apparatus 20 with which it has been determined at step S11 that a communication was established. It is noted that the process of step S13 is executed by the notification processing portion 112 of the control portion 11.

[Character Input Process]

Next, the character input process executed by the control portion 21 on the information processing apparatus 20 side is described with reference to FIG. 3. It is noted that the character input process is executed by the conversion processing portion 212 of the control portion 21.

<Step S21>

At step S21, the control portion 21 determines whether or not a user performed a character input operation on the operation display portion 26. As described above, a character input operation is performed to make a registration of an address book or the like. Here, upon determining that a character input operation was performed (Yes side at S21), the control portion 21 moves the process to step S22. On the other hand, the control portion 21 repeatedly executes the determination process of step S21 until a registration start operation is performed (No side at S21).

<Step S22>

At step S22, the control portion 21 determines whether or not the confirmation condition was satisfied for an input character that was input by the character input operation determined at step S21. The confirmation condition is, for example, a predetermined operation such as an operation of an "OK" key (confirmation key) or a "Chinese character" key (conversion key) performed on the operation display portion 26. In addition, the confirmation condition may be an input of the next character, or passing of a predetermined confirmation time period without an operation. With such a configuration, even after the motion notification is received and the input character is converted as described below, the conversion of the input character is confirmed when the confirmation condition is satisfied.

Here, upon determining that the confirmation condition was satisfied (Yes side at step S22), the control portion 21 confirms the input of the input character, and returns the process to step S21. On the other hand, upon determining that the confirmation condition has not been satisfied (No side at step S22), the control portion 21 moves the process to step S23 without confirming the input of the input character. It is noted that once the input of the input character is confirmed, switching the input character between a large character and a small character is not possible, but converting a character string including the input character to Chinese character(s) is possible.

<Step S23>

Next, at step S23, the control portion 21 determines whether or not a motion notification has been received from the mobile terminal 10, wherein the motion notification indicates that the motion of shaking the mobile terminal 10 was detected. Here, upon determining that a motion notification has been received (Yes side at S23), the control portion 21 moves the process to step S24. On the other hand, upon determining that a motion notification has not been received (No side at S23), the control portion 21 returns the process to step S22.

Here, the information processing apparatus 20 may receive a motion notification from a mobile terminal 10 of a user who is not the current user of the information processing apparatus 20. However, with the configuration where the mobile terminal 10 and the information processing apparatus 20 communicate with each other based on the short-distance wireless communication standard, the information processing apparatus 20 can receive the motion notification only from the mobile terminal 10 which is within a proximate range. As a result, the information processing apparatus 20 can detect only the motion of shaking the mobile terminal 10 performed by the current user of the information processing apparatus 20.

In addition, at step S23, the control portion 21 may determine whether or not the motion notification was transmitted by the mobile terminal 10 which corresponds to the user who was identified by the identification processing portion 211 and is currently logging in. That is, only when the control portion 21 determines at step S23 that the motion notification was transmitted by the mobile terminal 10 which corresponds to the current user of the information processing apparatus 20 who is currently logging in, the control portion 21 may move the process to step S24 so that the conversion is made as described below. With this configuration, only the motion of shaking the mobile terminal 10 performed by the current user of the information processing apparatus 20 can be detected even when the mobile terminal 10 and the information processing apparatus 20 communicate with each other based on the wireless LAN standard or the like which has a relatively wide communication range. It is noted that the user may be identified in the configuration where a wireless short-distance communication is performed.

<Step S24>

At step S24, the control portion 21 determines whether or not the last input character of a currently input character string can be switched between a large character and a small character. It is noted that in the following description, specific examples of Japanese hiragana and katakana characters are represented by alphabetical characters put in quotations. For example, when the input character is an alphabetical character, the control portion 21 determines that the input character can be switched between a large character and a small character. In addition, in the case where the input character is a Japanese hiragana or katakana character, and when the input character is any of "YA", "YU" and "YO" that are palatalized sounds, or "TSU" that is a double consonant, or any of "A", "I", "U", "E" and "O" that are vowels that can be used as small characters among the basic kana characters, the control portion 21 determines that the input character can be switched between a large character and a small character. Here, upon determining that the input character can be switched between a large character and a small character (Yes side at S24), the control portion 21 moves the process to step S25. On the other hand, upon determining that the input character cannot be switched between a large character and a small character (No side at S24), the control portion 21 returns the process to step S21.

<Step S25>

At step S25, the control portion 21 determines whether or not the last input character of the currently input character string is a large character. Here, upon determining that the input character is a large character (Yes side at S25), the control portion 21 moves the process to step S26. On the other hand, upon determining that the input character is not a large character (No side at S25), the control portion 21 moves the process to step S251.

<Step S26>

Figure 4A:
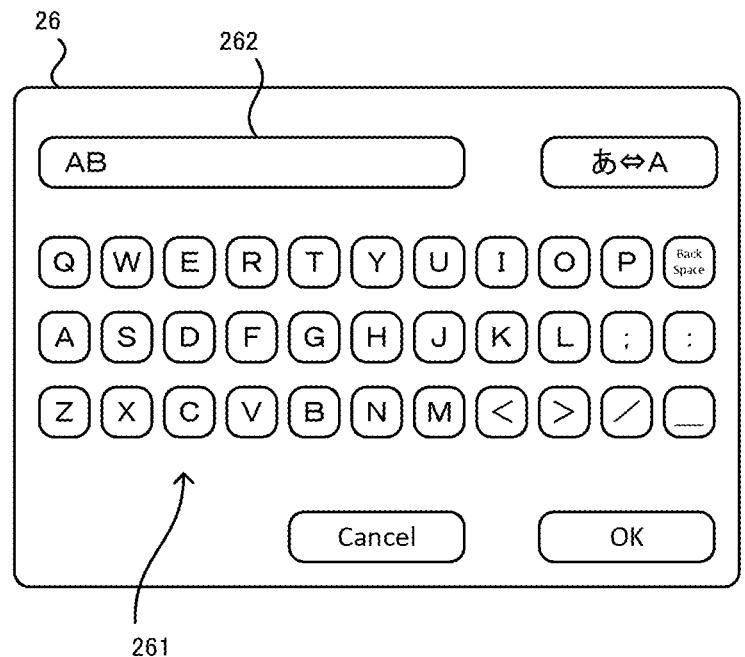
FIG. 4A and FIG. 4B are diagrams showing examples of execution results of a process that is executed by the information processing apparatus of the character input system according to the first embodiment of the present disclosure.
Figure 4B:
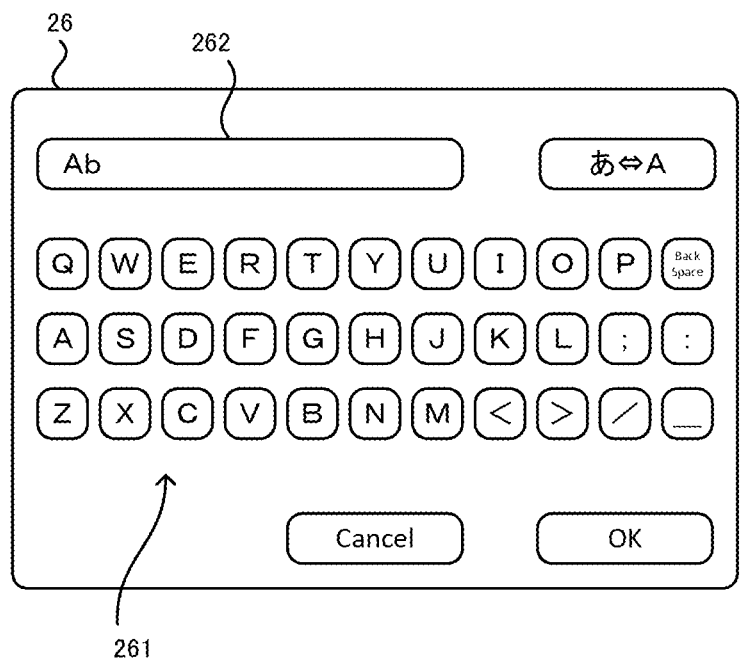
Figure 5A:
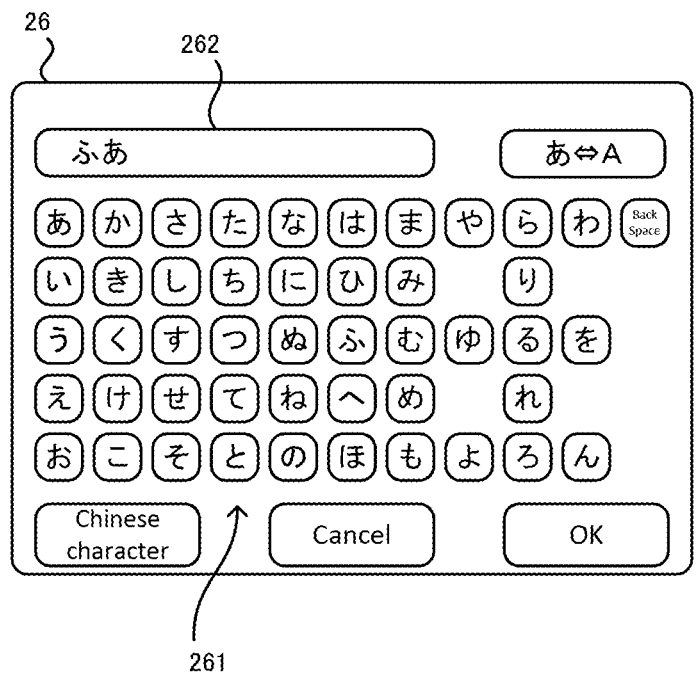
FIG. 5A and FIG. 5B are diagrams showing examples of execution results of a process that is executed by the information processing apparatus of the character input system according to the first embodiment of the present disclosure.
Figure 5B:
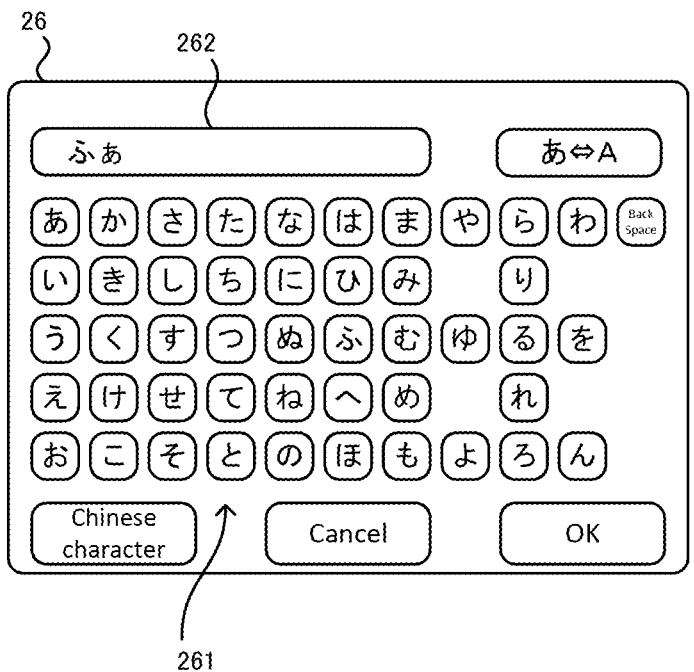

At step S26, the control portion 21 converts the last input character of the currently input character string to a small character. That is, in case the input character is a large character when the motion notification is received from the mobile terminal 10, the control portion 21 converts the input character to a small character. For example, in the state where, as shown in FIG. 4A, a character string "AB" has been input in the character input field 262 of the operation display portion 26, the last input character "B" of the character string "AB" is converted to a small character "b" at step S26, as shown in FIG. 4B. In addition, in the state where, as shown in FIG. 5A, a character string "FU"-"A" has been input in the character input field 262 of the operation display portion 26, the last input character "A" of the character string "FU"-"A" is converted to a small character "a" at step S26, as shown in FIG. 5B.

<Step S251>

At step S251, the control portion 21 converts the last input character of the currently input character string to a large character. That is, in case the input character is a small character when the motion notification is received from the mobile terminal 10, the control portion 21 converts the input character to a large character. For example, in the state where, as shown in FIG. 4B, a character string "Ab" has been input in the character input field 262 of the operation display portion 26, the last input character "b" of the character string "Ab" is converted to a large character "B" at step S26, as shown in FIG. 4A. In addition, in the state where, as shown in FIG. 5B, a character string "FU"-"a" has been input in the character input field 262 of the operation display portion 26, the last input character "a" of the character string "FU"-"a" is converted to a large character "A" at step S26, as shown in FIG. 5A.

It is noted that the conversion of the input character between a large character and a small character at step S26 or S251 is repeatedly executed until it is determined at step S22 that the confirmation condition was satisfied for the input character. That is, each time the motion notification is received, the control portion 21 converts the input character to a large character and a small character alternately.

As described above, in the character input system 1, the user can convert the input character to a large character or a small character by performing the motion of shaking the mobile terminal 10 while inputting characters on the information processing apparatus 20. As a result, the user can operate the operation display portion 26 with one hand, and perform the motion of shaking the mobile terminal 10 with the other hand to convert the input character between a large character and a small character, for example. This makes it possible to input characters efficiently to the information processing apparatus 20, resulting in reduction of the time spent for the input work. In addition, the configuration eliminates the need to display an operation key for the conversion between a large character and a small character on the operation display portion 26 of the information processing apparatus 20, allowing the space for the operation key to be used for another purpose.

Second Embodiment

In the first embodiment, the description is provided by taking, as an example, a case where the control portion 21 of the information processing apparatus 20 converts the input character to a large character or a small character. In the present embodiment, a description is provided by taking, as an example, a case where the control portion 21 converts the input character to a voiced consonant or a p-sound, with reference to FIG. 6, FIG. 7A, FIG. 7B and FIG. 7C. It is noted that the processes that are the same as those shown in FIG. 3 are assigned the same reference signs, and description thereof is omitted.

<Step S31>

Figure 6:
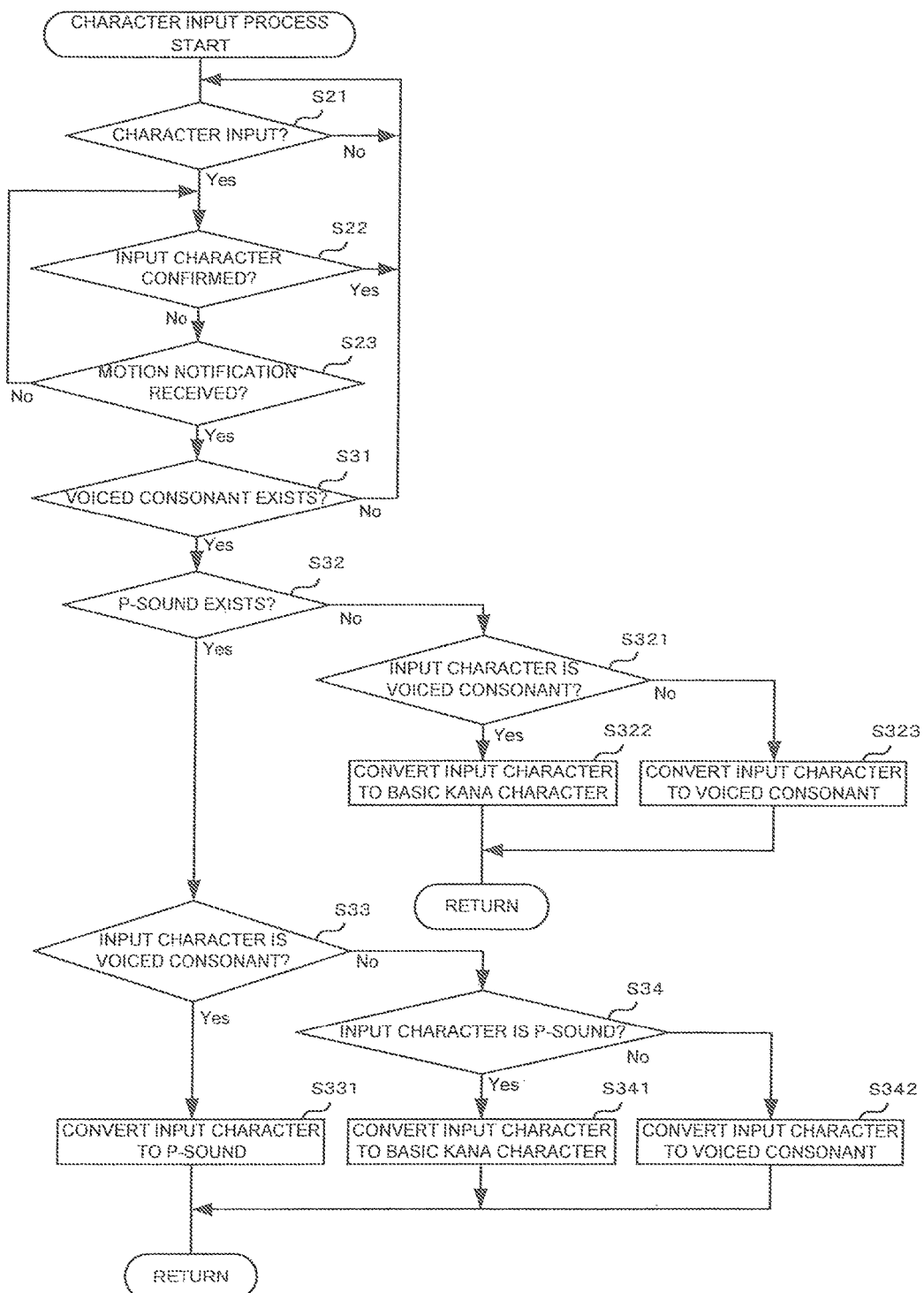
FIG. 6 is a flowchart showing an example of a process that is executed by the information processing apparatus of the character input system according to the second embodiment of the present disclosure.

As shown in FIG. 6, when the control portion 21 determines at step S23 that the motion notification has been received, the control portion 21 moves the process to step S31. At step S31, the control portion 21 determines whether or not there exists a voiced consonant for the last input character of the currently input character string. Specifically, the control portion 21 determines that there exists a voiced consonant for the input character when the input character belongs to any of the "KA" row, "SA" row, "TA" row or "HA" row of the Japanese syllabary. It is noted that the control portion 21 determines that there exists a voiced consonant for the input character even when the currently input character is a voiced consonant.

Here, upon determining that there exists a voiced consonant for the input character (Yes side at S31), the control portion 21 moves the process to step S32. On the other hand, upon determining that there does not exist a voiced consonant for the input character (No side at S31), the control portion 21 returns the process to step S21. That is, when there exists neither a voiced consonant nor a p-sound corresponding to the character that has been input on the operation display portion 26, the process returns to step S21 without conversion of the input character.

<Step S32>

Next, at step S32, the control portion 21 determines whether or not there exists a p-sound for the last input character of the currently input character string. Specifically, the control portion 21 determines that there exists a p-sound for the input character when the input character belongs to the "HA" row of the Japanese syllabary. It is noted that the control portion 21 determines that there exists a p-sound for the input character even when the currently input character is a p-sound. Here, upon determining that there exists a p-sound for the input character (Yes side at S32), the control portion 21 moves the process to step S33. On the other hand, upon determining that there does not exist a p-sound for the input character (No side at S32), the control portion 21 moves the process to step S321.

<Step S33>

At step S33, the control portion 21 determines whether or not the last input character of the currently input character string is a voiced consonant. Here, upon determining that the input character is a voiced consonant (Yes side at S33), the control portion 21 moves the process to step S331. On the other hand, upon determining that the input character is not a voiced consonant (No side at S33), the control portion 21 moves the process to step S34.

<Step S34>

At step S34, the control portion 21 determines whether or not the last input character of the currently input character string is a p-sound. Here, upon determining that the input character is a p-sound (Yes side at S34), the control portion 21 moves the process to step S341. On the other hand, upon determining that the input character is not a p-sound (No side at S34), the control portion 21 moves the process to step S342.

<Step S331>

At step S331, the control portion 21 converts the last input character of the currently input character string to a p-sound. That is, when the motion notification is received from the mobile terminal 10 while there exist both a voiced consonant and a p-sound corresponding to the character that has been input on the operation display portion 26, and the currently input character is a voiced consonant, the control portion 21 converts the input character to a p-sound.

<Step S341>

At step S341, the control portion 21 converts the last input character of the currently input character string to a basic kana character. That is, when the motion notification is received from the mobile terminal 10 while there exist both a voiced consonant and a p-sound that correspond to the character that has been input on the operation display portion 26, and the currently input character is a p-sound, the control portion 21 converts the input character to a basic kana character.

<Step S342>

At step S342, the control portion 21 converts the last input character of the currently input character string to a voiced consonant. That is, when the motion notification is received from the mobile terminal 10 while there exist both a voiced consonant and a p-sound that correspond to the character that has been input on the operation display portion 26, and the currently input character is a basic kana character, the control portion 21 converts the input character to a voiced consonant.

Figure 7A:
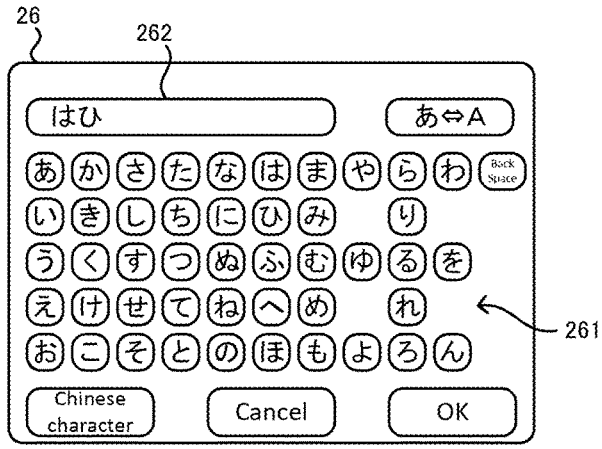
FIG. 7A, FIG. 7B and FIG. 7C are diagrams showing examples of execution results of the process that is executed by the information processing apparatus of the character input system according to the second embodiment of the present disclosure.
Figure 7B:
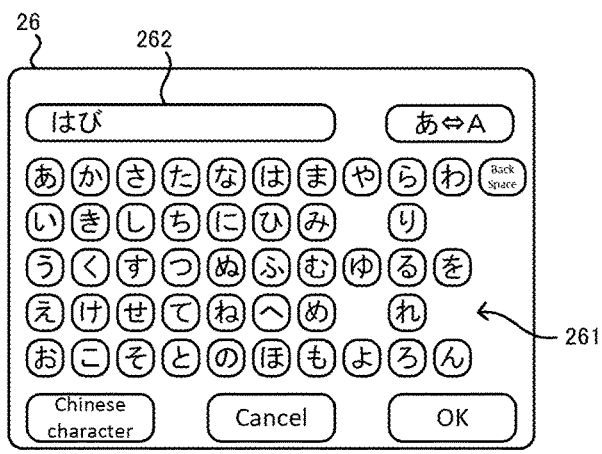
Figure 7C:
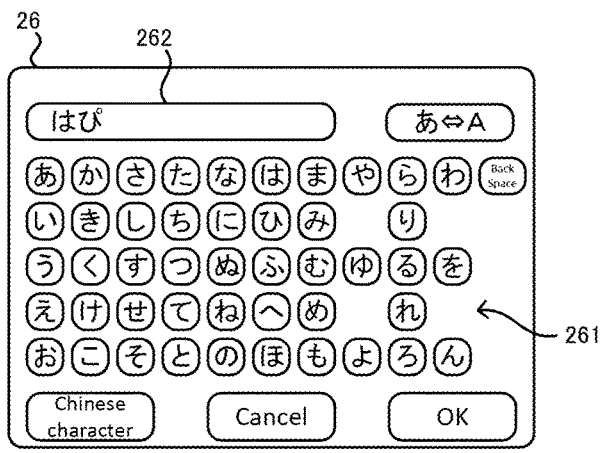

That is, for example, in the state where, as shown in FIG. 7A, a character string "HA"-"HI" has been input in the character input field 262 of the operation display portion 26, the last input character "HI", which is a basic kana character, of the character string "HA"-"HI" is converted to a character "BI", which is a voiced consonant, as shown in FIG. 7B at step S342. In addition, in the case where, as shown in FIG. 7B, a character string "HA"-"BI" has been input in the character input field 262 of the operation display portion 26, the last input character "BI", which is a voiced consonant, of the character string "HA"-"BI" is converted to a character "PI", which is a p-sound, as shown in FIG. 7C at step S331. Furthermore, in the case where, as shown in FIG. 7C, a character string "HA"-"PI" has been input in the character input field 262 of the operation display portion 26, the last input character "PI", which is a p-sound, of the character string "HA"-"PI" is converted to a character "HI", which is a basic kana character, as shown in FIG. 7A at step S341.

<Step S321>

At step S321, the control portion 21 determines whether or not the last input character of the currently input character string is a voiced consonant. Here, upon determining that the input character is a voiced consonant (Yes side at S321), the control portion 21 moves the process to step S322. On the other hand, upon determining that the input character is not a voiced consonant (No side at S321), the control portion 21 moves the process to step S323.

<Step S322>

At step S322, in a similar manner to step S341, the control portion 21 converts the last input character of the currently input character string to a basic kana character. That is, when the motion notification is received from the mobile terminal 10 while there exists a voiced consonant that corresponds to the character that has been input on the operation display portion 26, but not a p-sound, and the currently input character is a voiced consonant, the control portion 21 converts the input character to a basic kana character.

<Step S323>

At step S323, in a similar manner to step S342, the control portion 21 converts the last input character of the currently input character string to a voiced consonant. That is, when the motion notification is received from the mobile terminal 10 while there exists a voiced consonant that corresponds to the character that has been input on the operation display portion 26, but not a p-sound, and the currently input character is a basic kana character, the control portion 21 converts the input character to a voiced consonant.

Third Embodiment

Meanwhile, in the case where the input character is "TSU" that can be used as a double consonant in Japanese, the input character can be converted between a voiced consonant and a basic kana character and between a large character and a small character. In view of this, the present embodiment describes a character input process by taking into consideration a case where a character "TSU" is input, with reference to FIG. 8, FIG. 9A, FIG. 9B and FIG. 9C. It is noted that the processes that are the same as those shown in FIG. 3 are assigned the same reference signs, and description thereof is omitted.

<Step S41>

Figure 8:
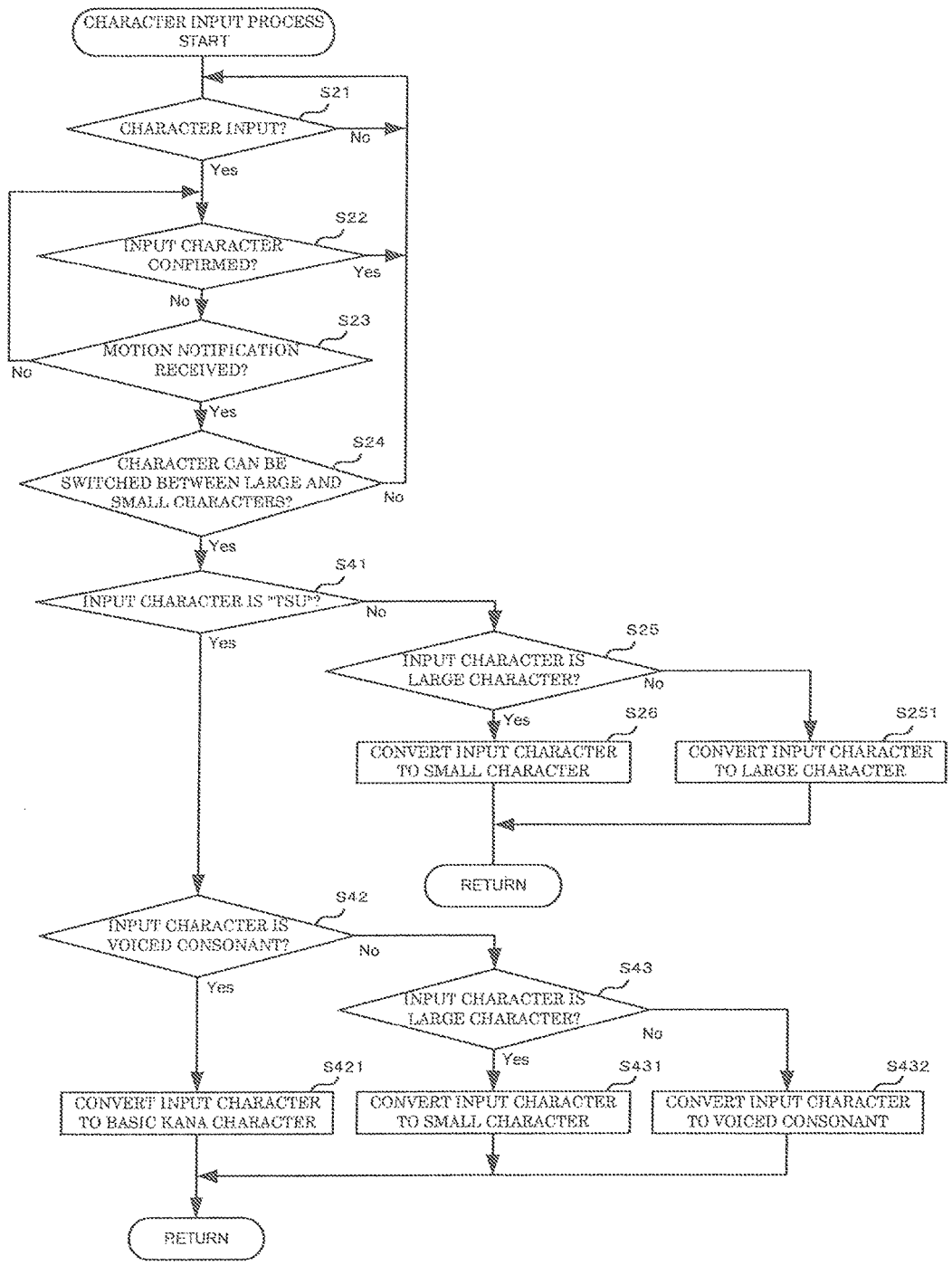
FIG. 8 is a flowchart showing an example of a process that is executed by the information processing apparatus of the character input system according to the third embodiment of the present disclosure.

As shown in FIG. 8, upon determining that the input character can be switched between a large character and a small character (Yes side at S24), the control portion 21 moves the process to step S41. At step S41, the control portion 21 determines whether or not the last input character of the currently input character string is "TSU". Here, upon determining that the input character is "TSU" (Yes side at S41), the control portion 21 moves the process to step S42. On the other hand, upon determining that the input character is not "TSU" (No side at S41), the control portion 21 moves the process to step S25.

<Step S42>

At step S42, the control portion 21 determines whether or not the last input character of the currently input character string is a voiced consonant. Here, upon determining that the input character is a voiced consonant (Yes side at S42), the control portion 21 moves the process to step S421. On the other hand, upon determining that the input character is not a voiced consonant (No side at S42), the control portion 21 moves the process to step S43.

<Step S43>

At step S43, the control portion 21 determines whether or not the last input character of the currently input character string is a large character. Here, upon determining that the input character is a large character (Yes side at S43), the control portion 21 moves the process to step S431. On the other hand, upon determining that the input character is not a large character (No side at S43), the control portion 21 moves the process to step S432.

<Step S421>

Figure 9A:
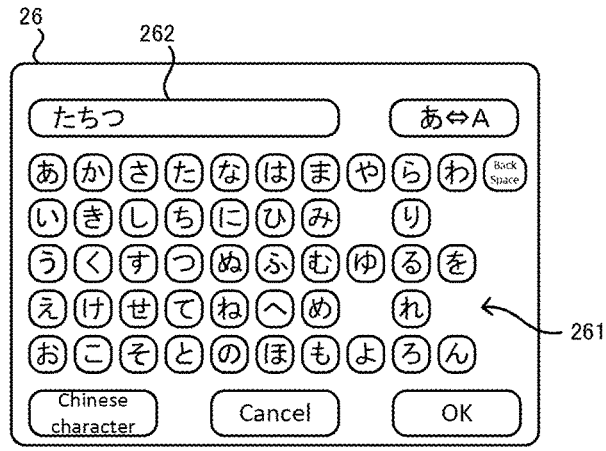
FIG. 9A, FIG. 9B and FIG. 9C are diagrams showing examples of execution results of the process that is executed by the information processing apparatus of the character input system according to the third embodiment of the present disclosure.
Figure 9B:
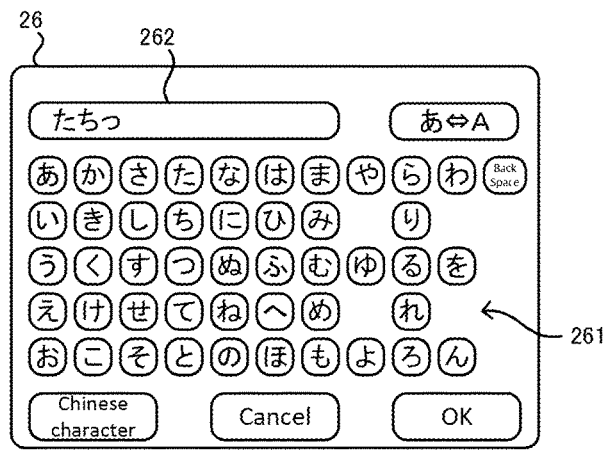
Figure 9C:
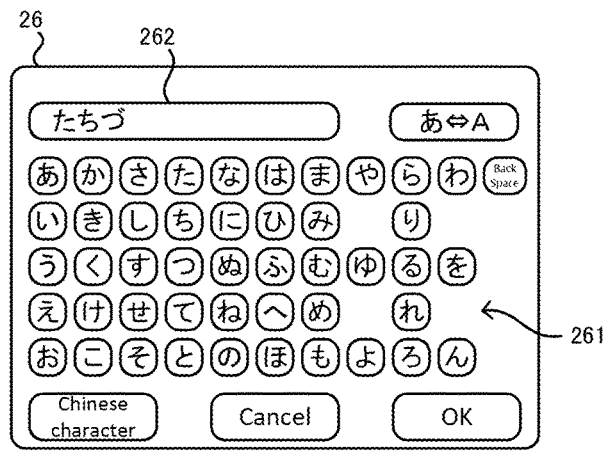

At step S421, the control portion 21 converts the last input character of the currently input character string to a basic kana character. That is, when the motion notification is received from the mobile terminal 10, and, as shown in FIG. 9C, the input character that has been input on the operation display portion 26 is a voiced consonant "ZU", the control portion 21 converts the input character to a basic kana character "TSU", as shown in FIG. 9A.

<Step S431>

At step S431, the control portion 21 converts the last input character of the currently input character string to a small character. That is, when the motion notification is received from the mobile terminal 10, and, as shown in FIG. 9A, the input character that has been input on the operation display portion 26 is a basic kana character "TSU", the control portion 21 converts the input character to a small character "tsu", as shown in FIG. 9B.

<Step S432>

At step S432, the control portion 21 converts the last input character of the currently input character string to a voiced consonant. That is, when the motion notification is received from the mobile terminal 10, and, as shown in FIG. 9B, the input character that has been input on the operation display portion 26 is a small character "tsu", the control portion 21 converts the input character to a voiced consonant "ZU", as shown in FIG. 9C.

It is noted that, in the character input process executed by the control portion 21, as far as a convertible character can be converted among any of a small character, a large character, a basic kana character, a double consonant, a palatalized sound, a voiced consonant, and a p-sound in sequence in response to reception of the motion notification, the content of the conversion and the conversion order are not limited to those described above.

In addition, the motion detecting sensor 15 of the mobile terminal 10 may be able to detect a direction toward which the mobile terminal 10 was shaken, and the notification processing portion 112 may transmit, to the information processing apparatus 20, the motion notification including the direction toward which the mobile terminal 10 was shaken. In that case, the control portion 21 can switch the content of the conversion based on the direction toward which the mobile terminal 10 was shaken. Specifically, the control portion 21 may be configured to selectively execute a first conversion mode and a second conversion mode, wherein in the first conversion mode, the input character is converted to a large character or a small character, and in the second conversion mode, the input character is converted to any of a double consonant, a palatalized sound, a voiced consonant, and a p-sound. For example, when the mobile terminal 10 is shaken horizontally, the first conversion mode is executed, and when the mobile terminal 10 is shaken vertically, the second conversion mode is executed. It is noted that, not limited to the direction toward which the mobile terminal 10 was shaken, the control portion 21 may be configured to switch the content of the conversion based on an operation of a predetermined switch key displayed on the operation display portion 26, or based on the initial settings.

Furthermore, as another embodiment, control portion 21 may be configured to selectively execute the conversion of the input character and the switching between the first conversion mode and the second conversion mode, based on the direction toward which the mobile terminal 10 was shaken. For example, when the mobile terminal 10 is shaken horizontally, the conversion mode is switched between the first conversion mode and the second conversion mode, and when the mobile terminal 10 is shaken vertically, the input character is converted in the current conversion mode that is the first conversion mode or the second conversion mode.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A character input system comprising a mobile terminal and an information processing apparatus, wherein
   the mobile terminal includes:
   a motion detecting sensor configured to detect a motion of shaking the mobile terminal; and
   a notification processing portion executable by a CPU and configured to transmit a motion notification to the information processing apparatus when the motion detecting sensor detects the motion of shaking the mobile terminal,
   the information processing apparatus includes:
   a character input screen that receives a character input operation performed on the character input screen; and
   a conversion processing portion executable by a CPU and configured to, upon reception of the motion notification from the mobile terminal, convert a last input character among one or more input characters that have been input on the character input screen when the last input character is a convertible character, and
   the conversion processing portion selectively executes a first conversion mode and a second conversion mode based on a predetermined operation, wherein in the first conversion mode, the conversion processing portion converts only the last input character among the one or more input characters that have been input on the character input screen, to a large character or to a small character when the last input character can be converted to a large character or to a small character, and in the second conversion mode, the conversion processing portion converts only the last input character among the one or more input characters that have been input on the character input screen, to a character having any of a double consonant, a palatalized sound, a voiced consonant, and a p-sound when there exists a voiced consonant or a p-sound that corresponds to the last input character.

2. The character input system according to claim 1, wherein
   the motion detecting sensor is configured to detect a direction toward which the mobile terminal was shaken,
   the notification processing portion is configured to transmit the motion notification including the direction toward which the mobile terminal was shaken, and
   the conversion processing portion is configured to selectively execute the first conversion mode and the second conversion mode based on the direction toward which the mobile terminal was shaken.

3. The character input system according to claim 1, wherein
   the motion detecting sensor is configured to detect a direction toward which the mobile terminal was shaken,
   the notification processing portion is configured to transmit the motion notification including the direction toward which the mobile terminal was shaken, and
   the conversion processing portion is configured to selectively execute, based on the direction toward which the mobile terminal was shaken, conversion of only the last input character and switching between the first conversion mode and the second conversion mode.

4. The character input system according to claim 1, wherein
   the information processing apparatus further includes:
   an identification processing portion executable by a CPU and configured to identify a user who uses the information processing apparatus, wherein
   the conversion processing portion converts the last input character only when the motion notification is received from a mobile terminal that, in advance, has been associated with the user who was identified by the identification processing portion.

5. The character input system according to claim 1, wherein
   the mobile terminal and the information processing apparatus are configured to communicate with each other by a wireless short-distance communication.

6. A character input method in which, upon detection of a motion of shaking a mobile terminal, the mobile terminal transmits a motion notification to an information processing apparatus, and the information processing apparatus, upon reception of the motion notification, converts a last input character among one or more input characters that have been input on a character input screen displayed by a character input portion, when the last input character is a convertible character, wherein
- a first conversion mode and a second conversion mode are executed based on a predetermined operation,
- in the first conversion mode, only the last input character among the one or more input characters that have been input on the character input screen is converted to a large character or to a small character when the last input character can be converted to a large character or to a small character, and
- in the second conversion mode, only the last input character among the one or more input characters that have been input on the character input screen is converted to any of a double consonant, a palatalized sound, a voiced consonant, and a p-sound when there exists a voiced consonant or a p-sound that corresponds to the last input character.

* * * * *